United States Patent
Awano et al.

(10) Patent No.: US 12,477,272 B2
(45) Date of Patent: Nov. 18, 2025

(54) SOUND COLLECTION DEVICE, SOUND COLLECTION METHOD, AND STORAGE MEDIUM STORING SOUND COLLECTION PROGRAM

(71) Applicant: Mitsubishi Electric Corporation, Tokyo (JP)

(72) Inventors: Tomoharu Awano, Tokyo (JP); Masaru Kimura, Tokyo (JP); Shigeaki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 244 days.

(21) Appl. No.: 18/379,379

(22) Filed: Oct. 12, 2023

(65) Prior Publication Data

US 2024/0048900 A1 Feb. 8, 2024

Related U.S. Application Data

(63) Continuation of application No. PCT/JP2021/019122, filed on May 20, 2021.

(51) Int. Cl.
*H04R 1/40* (2006.01)
(52) U.S. Cl.
CPC .................................... *H04R 1/406* (2013.01)
(58) Field of Classification Search
CPC ............. G10L 21/0272; G10L 21/0232; G10L 21/0216; G10L 21/0224;

(Continued)

(56) References Cited

U.S. PATENT DOCUMENTS 8,477,958 B2 * 7/2013 Moeller ............... H05K 5/0247
700/94
8,718,290 B2 * 5/2014 Murgia ................... H04R 3/005
381/71.1

(Continued)

FOREIGN PATENT DOCUMENTS

| JP | 2009-272876 A | 11/2009 |
| JP | 2010-187066 A | 8/2010 |

(Continued)

OTHER PUBLICATIONS

International Search Report (PCT/ISA/210), issued in PCT/JP2021/019122, dated Jul. 20, 2021.

(Continued)

*Primary Examiner* — Lun-See Lao
(74) *Attorney, Agent, or Firm* — Birch, Stewart, Kolasch & Birch, LLP

(57) ABSTRACT

A sound collection device performs Fourier transform on a first sound reception signal outputted from a first microphone and outputs a first signal, performs Fourier transform on a second sound reception signal outputted from a second microphone and outputs a second signal, estimates an arrival direction of the voice, calculates a phase of a cross-spectrum of the first signal and the second signal, determines a mask coefficient based on an arrival direction phase table indicating a relationship between the phase and the arrival direction regarding each frequency band, the calculated phase, and the estimated arrival direction, separates a signal from the first signal or the second signal by using the mask coefficient, and performs inverse Fourier transform on the separated signal and outputs a signal of a target voice.

7 Claims, 7 Drawing Sheets

(58) Field of Classification Search
CPC ........... G10L 2021/02166; G10L 25/30; G10L 25/18; G10L 21/0332; G10L 15/26; G10L 19/0212; G10L 19/06; G10L 2021/02087; G10L 21/02; G10L 21/0208; G10L 21/0264; G10L 21/0308; G10L 21/0364; G10L 25/24; G10L 25/27; H04R 1/40; H04R 1/406; H04R 3/005; G06N 3/045; G06N 3/08; H04B 3/21; H04B 3/23
USPC ................. 381/92, 76, 74, 14–74.16; 700/94
See application file for complete search history.

(56) References Cited

U.S. PATENT DOCUMENTS

| | | | | |
|---|---|---|---|---|
| 9,432,770 | B2* | 8/2016 | Nguyen | H04R 3/005 |
| 10,499,151 | B2* | 12/2019 | McGibney | H04R 3/005 |
| 2011/0131044 | A1* | 6/2011 | Fukuda | G10L 21/028 |
| | | | | 704/E17.001 |
| 2020/0382893 | A1* | 12/2020 | Kobayashi | G06F 3/165 |

FOREIGN PATENT DOCUMENTS

| WO | WO 2019/163013 A1 | 8/2019 |
|---|---|---|
| WO | WO 2020/110228 A1 | 6/2020 |

OTHER PUBLICATIONS

Indian Office Action for Indian Application No. 202347062583, dated Mar. 7, 2025, with an English translation.

* cited by examiner

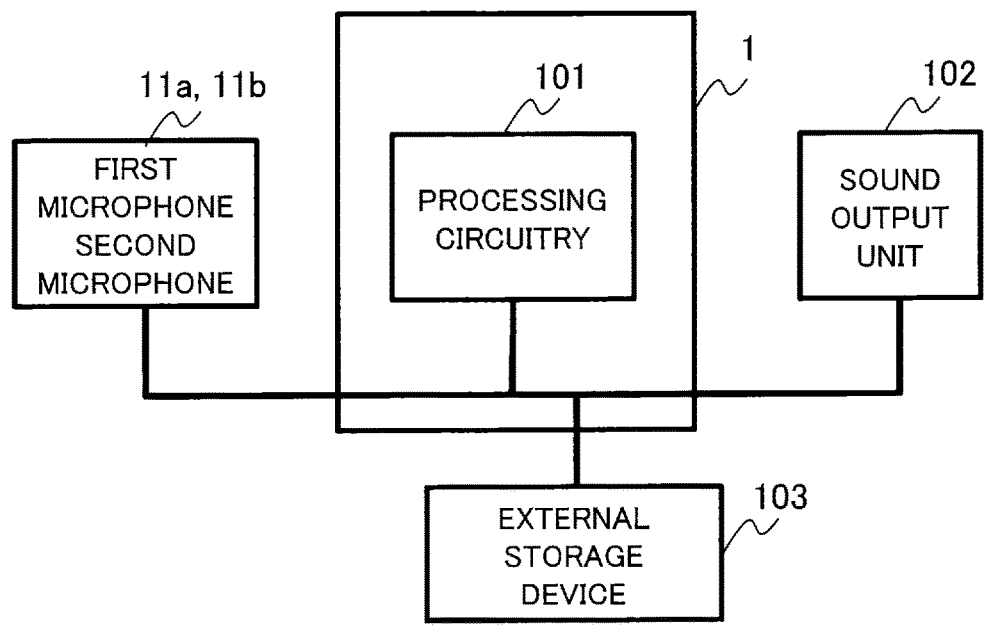
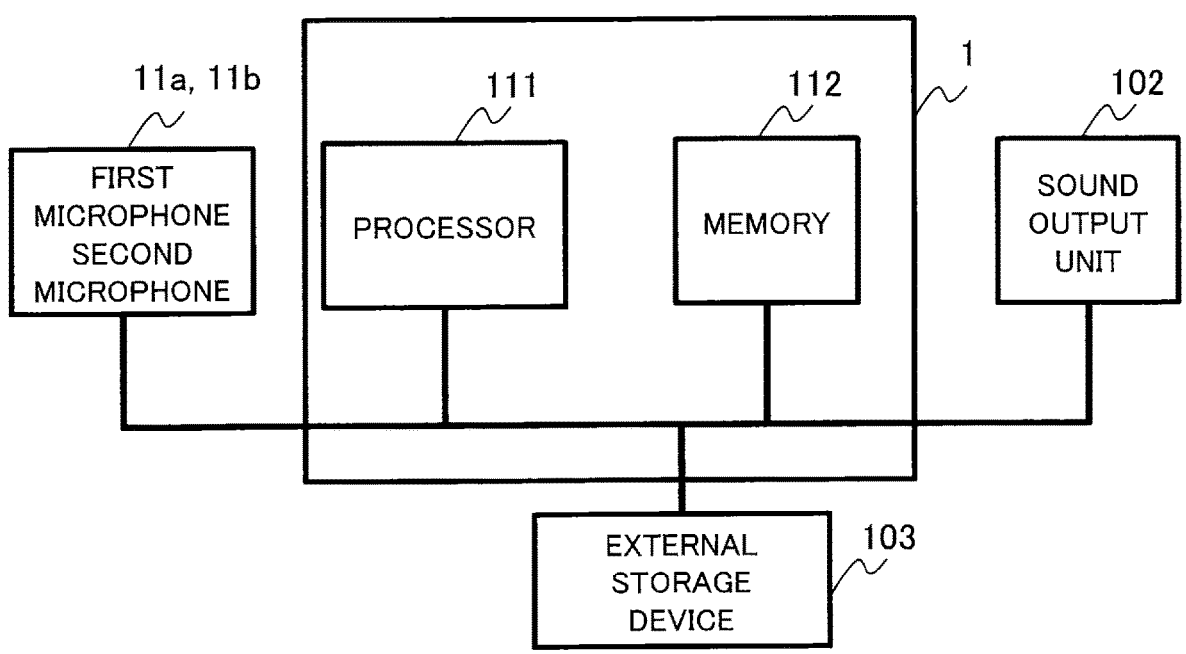

SIGNAL $X_1(\omega,\tau), X_2(\omega,\tau)$

CROSS-SPECTRUM $D(\omega,\tau)$
PHASE $\Phi_D(\omega,\tau)$

FIG. 6

INTER-MICROPHONE DISTANCE d = 15 cm
SAMPLING FREQUENCY 16 kHz

15

| INTER-MICROPHONE SAMPLE DIFFERENCE | DISTANCE DIFFERENCE $\delta\theta$ | $\sin\theta$ | $\Theta$ [rad] ANGLE OF ARRIVAL DIRECTION | $\Theta$ [degree] ANGLE OF ARRIVAL DIRECTION | PHASE OF CROSS-SPECTRUM [degree] (f = 4 kHz) | PHASE OF CROSS-SPECTRUM [degree] (f = 6 kHz) |
|---|---|---|---|---|---|---|
| 1 | 2.125 | 0.1416667 | 0.142145 | 8.144301 | 90 | 144 |
| 2 | 4.25 | 0.2833333 | 0.287268 | 16.45925 | 180 | 288 |
| 3 | 6.375 | 0.425 | 0.438962 | 25.15066 | 270 | 72 |
| 4 | 8.5 | 0.5666667 | 0.602455 | 34.51811 | 0 | 216 |
| 5 | 10.625 | 0.7083333 | 0.787134 | 45.09947 | 90 | 0 |
| 6 | 12.75 | 0.85 | 1.015985 | 58.21167 | 180 | 144 |
| 7 | 14.875 | 0.9916667 | 1.441607 | 82.598 | 270 | 288 |
| ... | ... | ... | ... | ... | ... | ... |

FIG. 7

INTER-MICROPHONE DISTANCE d = 15 cm
SAMPLING FREQUENCY 16 kHz

| INTER-MICROPHONE SAMPLE DIFFERENCE | DISTANCE DIFFERENC $\bar{\delta}\theta$ | $\sin \theta$ | Θ [rad] ANGLE OF ARRIVAL DIRECTION | Θ [degree] ANGLE OF ARRIVAL DIRECTION | PHASE OF CROSS-SPECTRUM [degree] (f = 4 kHz) | PHASE OF CROSS-SPECTRUM [degree] (f = 6 kHz) |
|---|---|---|---|---|---|---|
| 1 | 2.125 | 0.1416667 | 0.142145 | 8.144301 | 90 | 144 |
| 2 | 4.25 | 0.2833333 | 0.287268 | 16.45925 | 180 | 288 |
| 3 | 6.375 | 0.425 | 0.438962 | 25.15066 | 270 | 72 |
| 4 | 8.5 | 0.5666667 | 0.602455 | 34.51811 | 0 | 216 |
| 5 | 10.625 | 0.7083333 | 0.787134 | 45.09947 | 90 | 0 |
| 6 | 12.75 | 0.85 | 1.015985 | 58.21167 | 180 | 144 |
| 7 | 14.875 | 0.9916667 | 1.441607 | 82.598 | 270 | 288 |
| ... | ... | ... | ... | ... | ... | ... |

SOUND COLLECTION DEVICE, SOUND COLLECTION METHOD, AND STORAGE MEDIUM STORING SOUND COLLECTION PROGRAM

CROSS-REFERENCE TO RELATED APPLICATION

This application is a continuation application of International Application No. PCT/JP2021/019122 having an international filing date of May 20, 2021.

BACKGROUND OF THE INVENTION

1. Field of the Invention

The present disclosure relates to a sound collection device, a sound collection method and a sound collection program.

2. Description of the Related Art

There has been proposed a device that converts sound reception signals obtained by two microphones to signals in the frequency domain, calculates a phase difference between the signals in the frequency domain, estimates a parameter of a probability distribution model having frequency dependence, generates a mask by using the probability distribution model, and executes sound source separation (i.e., voice separation) by using the mask. See Patent Reference 1, for example. Expectation maximization (EM) algorithm is used for updating the parameter of the probability distribution model of the device.

Patent Reference 1: Japanese Patent Application Publication No. 2010-187066 (see claims 1 and 4, Paragraphs 0026-0059 and FIG. 4, for example).

However, in the device using the EM algorithm for updating the parameter of the probability distribution model, there are cases where voice cannot be separated accurately.

SUMMARY OF THE INVENTION

An object of the present disclosure is to make it possible to execute the voice separation with high accuracy.

A sound collection device in the present disclosure is a device that separates a signal of a target voice from a first sound reception signal outputted from a first microphone to which voice is inputted and a second sound reception signal outputted from a second microphone to which the voice is inputted. The sound collection device includes processing circuitry to perform Fourier transform on the first sound reception signal and to output a first signal; to perform Fourier transform on the second sound reception signal and to output a second signal; to estimate an arrival direction of the voice; to calculate a phase of a cross-spectrum of the first signal and the second signal; to determine a mask coefficient based on an arrival direction phase table read out from a previously generated database and indicating a relationship between the phase and the arrival direction regarding each frequency band, the calculated phase, and the estimated arrival direction; to separate a signal from the first signal or the second signal by using the mask coefficient; and to perform inverse Fourier transform on the separated signal and to output the signal of the target voice.

A sound collection method in the present disclosure is a method executed by a sound collection device that separates a signal of a target voice from a first sound reception signal outputted from a first microphone to which voice is inputted and a second sound reception signal outputted from a second microphone to which the voice is inputted. The sound collection method includes performing Fourier transform on the first sound reception signal and outputting a first signal; performing Fourier transform on the second sound reception signal and outputting a second signal; estimating an arrival direction of the voice; calculating a phase of a cross-spectrum of the first signal and the second signal; determining a mask coefficient based on an arrival direction phase table read out from a previously generated database and indicating a relationship between the phase and the arrival direction regarding each frequency band, the calculated phase, and the estimated arrival direction; separating a signal from the first signal or the second signal by using the mask coefficient; and performing inverse Fourier transform on the separated signal and outputting the signal of the target voice.

According to the present disclosure, the voice separation can be executed with high accuracy.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram showing an example of a hardware configuration of the sound collection device according to the first embodiment;

FIG. 3 is a diagram showing another example of the hardware configuration of the sound collection device according to the first embodiment;

FIG. 6 is a diagram showing an example of an arrival direction phase table;

FIG. 7 is a diagram showing an example of a determination process of a mask coefficient by use of the arrival direction phase table;

DETAILED DESCRIPTION OF THE INVENTION

A sound collection device, a sound collection method and a sound collection program according to each embodiment will be described below with reference to the drawings. The following embodiments are just examples and it is possible to appropriately combine embodiments and appropriately modify each embodiment.

First Embodiment

<Sound Collection Device 1>

Figure 1:
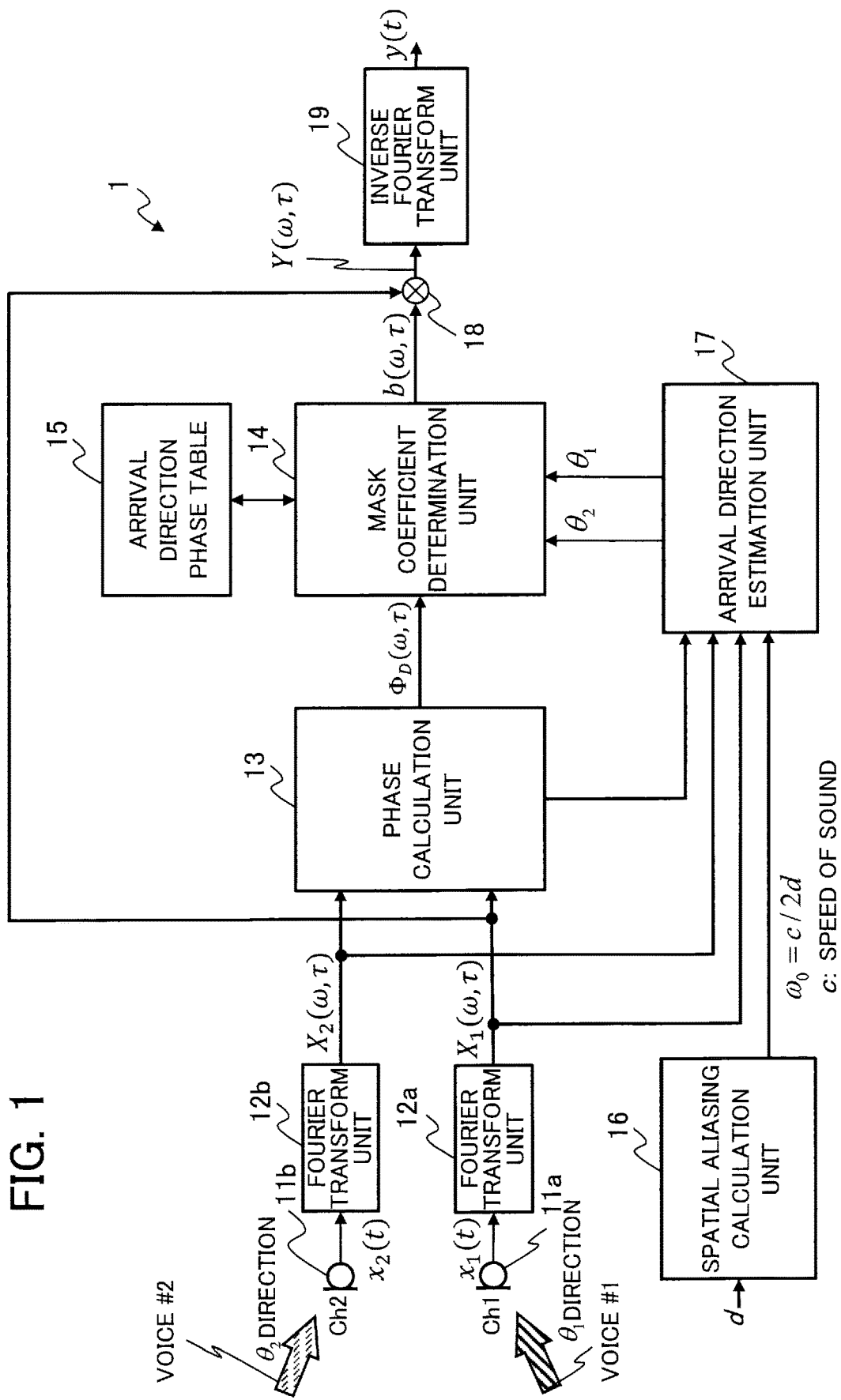
FIG. 1 is a functional block diagram schematically showing a configuration of a sound collection device according to a first embodiment.

FIG. 1 is a functional block diagram schematically showing the configuration of a sound collection device 1 according to a first embodiment. The sound collection device 1 is referred to also as a voice separation device. The sound collection device 1 is a device capable of executing a sound collection method according to the first embodiment. The sound collection method is referred to also as a voice separation method. As shown in FIG. 1, the sound collection device 1 is a device that separates a signal y(t) of a target voice from a first sound reception signal $x_1$(t) outputted from a first microphone 11a to which one or more voices (e.g., voice #1, voice #2) are inputted and a second sound reception signal $x_2$(t) outputted from a second microphone 11b to which the one or more voices (e.g., voice #1, voice #2) are inputted. Here, t represents the time. In other words, voice as a mixture of the voice #1 and the voice #2 is inputted to the first microphone 11a and the second microphone 11b, and the sound collection device 1 separates a voice signal of the voice of a target speaker (the voice #1 or the voice #2) from the sound reception signals of the voice as the mixture of the voice #1 and the voice #2.

The sound collection device 1 includes a first Fourier transform unit 12a, a second Fourier transform unit 12b, an arrival direction estimation unit 17, a phase calculation unit 13, a mask coefficient determination unit 14, a filter 18 and an inverse Fourier transform unit 19. Further, the sound collection device 1 includes a spatial aliasing calculation unit 16 and a storage device that stores an arrival direction phase table 15. The spatial aliasing calculation unit 16 can also be provided as a part of an external device different from the sound collection device 1. The arrival direction phase table 15 can also be a database stored in an external storage device different from the sound collection device 1.

<First and Second Microphones 11a and 11b>

Voice is inputted to the first microphone 11a in a first channel (Ch1) and the second microphone 11b in a second channel (Ch2). In the example of FIG. 1, the inputted voice is a mixture of the voice #1 uttered by a first speaker as a first sound source and the voice #2 uttered by a second speaker as a second sound source. An angle indicating the arrival direction of the voice #1 is represented as $\theta_1$, and an angle indicating the arrival direction of the voice #2 is represented as $\theta_2$. The first microphone 11a outputs the first sound reception signal $x_1$(t). The second microphone 11b outputs the second sound reception signal $x_2$(t). The number of microphones can also be three or more. The plurality of microphones are referred to also as a microphone array.

<First and Second Fourier Transform Units 12a and 12b>

The first Fourier transform unit 12a performs Fourier transform on the first sound reception signal $x_1$(t) outputted from the first microphone 11a and outputs a first signal $X_1(\omega, \tau)$ regarding a frame $\tau$ and an angular frequency $\omega$. The second Fourier transform unit 12b performs Fourier transform on the second sound reception signal $x_2$(t) outputted from the second microphone 11b and outputs a second signal $X_2(\omega, \tau)$ regarding the frame $\tau$ and the angular frequency $\omega$.

<Phase Calculation Unit 13>

The phase calculation unit 13 calculates a phase $\Phi_D(\omega, \tau)$ of a cross-spectrum $D(\omega, \tau)$ based on the first signal $X_1(\omega, \tau)$ and the second signal $X_2(\omega, \tau)$. A method for calculating the cross-spectrum $D(\omega, \tau)$ and the phase $\Phi_D(\omega, \tau)$ will be described later.

<Spatial Aliasing Calculation Unit 16>

The spatial aliasing calculation unit 16 calculates $\omega_0$ as a lower limit angular frequency causing the spatial aliasing based on a distance (i.e., inter-microphone distance) d between the first microphone 11a and the second microphone 11b and according to the following expression (1):

$$\omega_0 = \frac{c}{2d}. \tag{1}$$

The spatial aliasing does not occur at angular frequencies lower than the angular frequency $\omega$.

<Arrival Direction Estimation Unit 17>

The arrival direction estimation unit 17 calculates an angle $\theta$ indicating the arrival direction of the voice arriving at the first microphone 11a and the second microphone 11b. In the example of FIG. 1, the arrival direction estimation unit 17 estimates the angle $\theta_1$ indicating the arrival direction of the voice #1 included in the voice (i.e., mixed voice) arriving at the first microphone 11a and the second microphone 11b and the angle $\theta_2$ indicating the arrival direction of the voice #2 included in the arriving voice. The arrival direction estimation unit 17 is desired to calculate the arrival direction of the voice based on the first signal $X_1(\omega, \tau)$ and the second signal $X_2(\omega, \tau)$ at an angular frequency $\omega$ lower than the angular frequency $\omega_0$. This is because the arrival direction can be calculated erroneously if the arrival direction of the voice is calculated based on the first signal $X_1(\omega, \tau)$ and the second signal $X_2(\omega, \tau)$ at an angular frequency higher than or equal to the angular frequency $\omega_0$. Incidentally, the method of estimating (i.e., calculating) the arrival direction will be described later.

<Arrival Direction Phase Table 15>

The arrival direction phase table 15 is a correspondence table that indicates a relationship between the phase $\Phi_D(\omega, \tau)$ of the cross-spectrum $D(\omega, \tau)$ at each frequency f (i.e., angular frequency $\omega=2\pi f$) and the arrival direction of the voice. The arrival direction phase table 15 has been generated previously and stored in the storage device as a database. For example, the arrival direction phase table 15 is a correspondence table that indicates a relationship between the phase $\Phi_D(\omega, \tau)$ at each frequency having a certain bandwidth (i.e., each angular frequency band having a certain width) and the angle $\theta$ indicating the arrival direction. An example of the arrival direction phase table 15 will be described later.

<Mask Coefficient Determination Unit 14>

The mask coefficient determination unit 14 generates a mask coefficient $b(\omega, \tau)$ based on the phase $\Phi_D(\omega, \tau)$ of the cross-spectrum $D(\omega, \tau)$ calculated by the phase calculation unit 13, the angle $\theta$ indicating the arrival direction of the voice estimated by the arrival direction estimation unit 17 (the angle outputted from the arrival direction estimation unit 17 is a candidate for the angle indicating the arrival direction), and the arrival direction phase table 15. The mask coefficient $b(\omega, \tau)$ is a binary mask coefficient, for example. For example, the mask coefficient determination unit 14 sets the mask coefficient $b(\omega, \tau)$ at 1 when an item made up of the phase $\Phi_D(\omega, \tau)$ of the cross-spectrum $D(\omega, \tau)$ and the angle $\theta$ indicating the arrival direction of the voice exists in the arrival direction phase table 15 (i.e., when the phase $\Phi_D(\omega, \tau)$ satisfies a predetermined condition), and sets the mask coefficient $b(\omega, \tau)$ at 0 when such an item does not exist in the arrival direction phase table 15.

<Filter 18>

The filter 18 separates a signal $Y(\omega, \tau)$ in the frequency domain from the first signal $X_1(\omega, \tau)$ or the second signal $X_2(\omega, \tau)$ being a signal in the frequency domain by using the mask coefficient $b(\omega, \tau)$. In the case where the mask coefficient $b(\omega, \tau)$ is a binary mask coefficient, the filter 18 generates the signal $Y(\omega, \tau)$ by multiplying the first signal $X_1(\omega, \tau)$ or the second signal $X_2(\omega, \tau)$ by the mask coefficient $b(\omega, \tau)$. In the example of FIG. 1, the filter 18 separates the signal $Y(\omega, \tau)$ from the first signal $X_1(\omega, \tau)$ by using the mask coefficient $b(\omega, \tau)$. In the case where the voice #1 is the target voice, the signal $Y(\omega, \tau)$ is a signal in which components other than the voice #1 have been reduced. Incidentally, the target voice can also be a different voice such as the voice #2.

<Inverse Fourier Transform Unit 19>

The inverse Fourier transform unit 19 performs inverse Fourier transform on the signal $Y(\omega, \tau)$ in the frequency domain and outputs a voice signal $y(t)$ in the time domain corresponding to the target voice.

<Hardware Configuration>

FIG. 2 is a diagram showing an example of the hardware configuration of the sound collection device 1 according to the first embodiment. As shown in FIG. 2, the sound collection device 1 is implemented by processing circuitry 101. The processing circuitry 101 implements the functions of the first and second Fourier transform units 12a and 12b, the phase calculation unit 13, the arrival direction estimation unit 17, the mask coefficient determination unit 14, the filter 18 and the inverse Fourier transform unit 19 shown in FIG. 1. The processing circuitry 101 can be either dedicated hardware or a processor that executes a program. In the case where the processing circuitry is dedicated hardware, the processing circuitry is, for example, a single circuit, a combined circuit, a programmed processor, a parallelly programmed processor, an ASIC (Application Specific Integrated Circuit), an FPGA (Field-Programmable Gate Array) or a combination of some of these circuits.

A sound output unit 102 is, for example, a sound output circuit that outputs the voice signal to a speaker or the like. An external storage device 103 is, for example, a nonvolatile storage device such as a hard disk drive (HDD) or a solid state drive (SSD).

FIG. 3 is a diagram showing another example of the hardware configuration of the sound collection device 1 according to the first embodiment. As shown in FIG. 3, the sound collection device 1 in FIG. 3 includes a processor 111, such as a CPU (Central Processing Unit) executing a sound collection program stored in a memory 112, as the processing circuitry. The sound collection device 1 shown in FIG. 3 is a computer, for example. The sound collection program is installed from a program stored in a record medium (i.e., storage medium) or by the downloading via the Internet. The record medium is a non-transitory computer-readable storage medium storing a program such as the sound collection program. The processor 111 can be any one of a processing device, an arithmetic device, a microprocessor, a microcomputer and a DSP (Digital Signal Processor). The memory 112 is, for example, a volatile semiconductor memory such as a RAM (Random Access Memory).

Incidentally, it is also possible to implement part of the sound collection device 1 by dedicated hardware and implement part of the sound collection device 1 by software or firmware. As above, the processing circuitry is capable of implementing the functions described with reference to FIG. 1 by hardware, software, firmware or a combination of some of these means.

<Calculation of Phase $\Phi_D(\omega, \tau)$ and Angle $\theta$ Indicating Arrival Direction>

Figure 4:
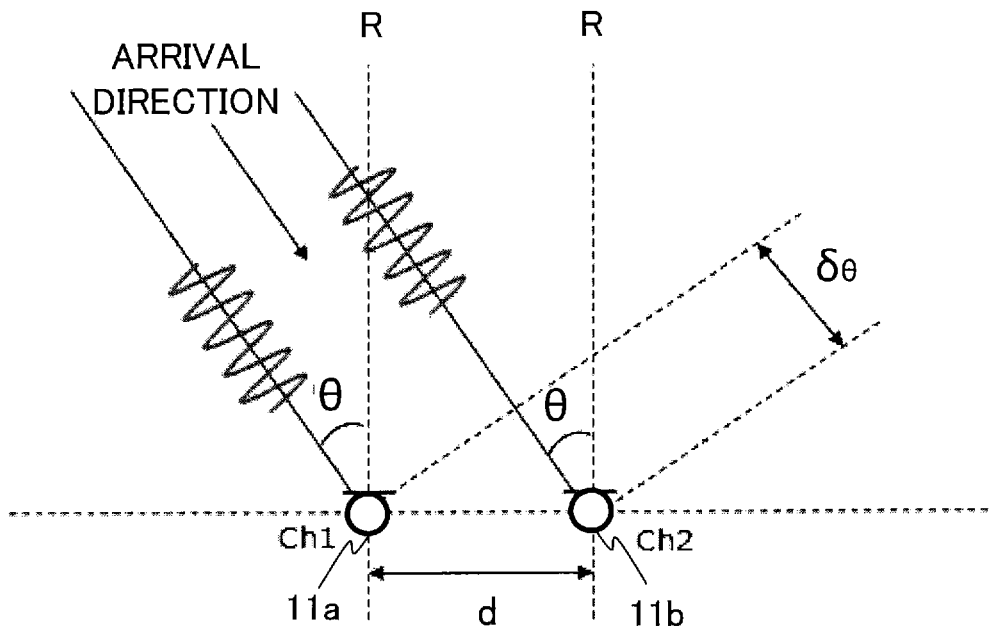
FIG. 4 is a diagram showing an arrival time difference of voice arriving at two microphones.

FIG. 4 is a diagram showing an arrival time difference $\delta_\theta$ of voice arriving at the first microphone 11a and the second microphone 11b. In FIG. 4, R represents reference lines extending in a direction orthogonal to an array direction of the first microphone 11a and the second microphone 11b. When the angle of the arrival direction of the voice (i.e., inverse direction of a sound source direction with reference to the first microphone 11a and the second microphone 11b) with respect to the reference line R (i.e., the angle indicating the arrival direction) is represented as $\theta$, the speed of sound is represented as c, and the distance between the first microphone 11a and the second microphone 11b is represented as d in FIG. 4, the arrival time difference $\delta_\theta$ is represented by the following expression (2):

$$\delta_\theta = \frac{d \sin\theta}{c}. \tag{2}$$

Based on the expression (2), the angle $\theta$ indicating the arrival direction is represented as the following expression (3):

$$\theta = \sin^{-1}\left(\frac{\delta_\theta \cdot c}{d}\right). \tag{3}$$

Figure 5A:
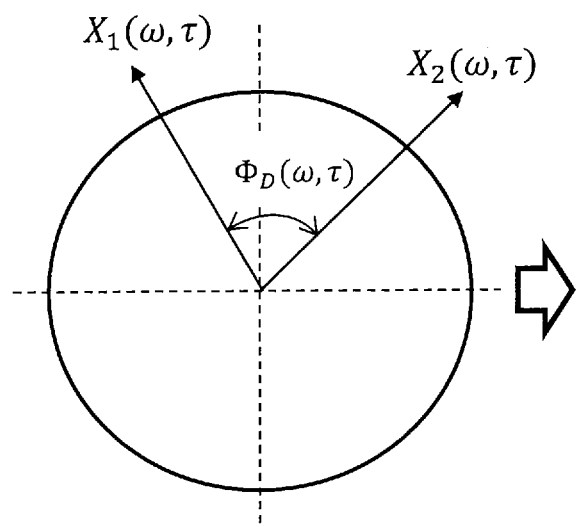
FIG. 5A is a diagram showing a phase difference between signals in the frequency domain.
Figure 5B:
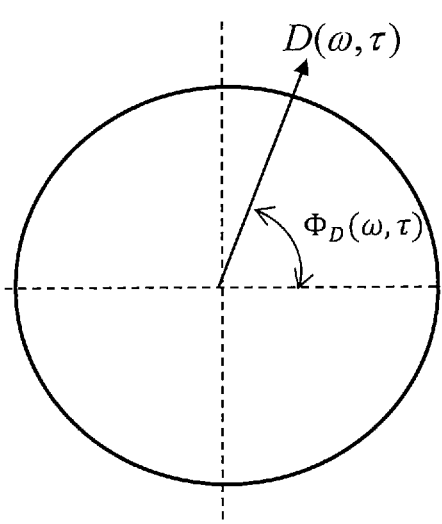
FIG. 5B is a diagram showing a phase of a cross-spectrum of the signals in the frequency domain.

FIG. 5A is a diagram showing a phase difference between the first signal $X_1(\omega, \tau)$ and the second signal $X_2(\omega, \tau)$ as signals in the frequency domain, and FIG. 5B is a diagram showing the phase $\Phi_D(\omega, \tau)$ of the cross-spectrum $D(\omega, \tau)$ of the first signal $X_1(\omega, \tau)$ and the second signal $X_2(\omega, \tau)$. The cross-spectrum $D(\omega, \tau)$ of the first signal $X_1(\omega, \tau)$ and the second signal $X_2(\omega, \tau)$ is represented by the following expression (4):

$$D(\omega,\tau)=X_1(\omega,\tau)\overline{X_2(\omega,\tau)} \tag{4}$$

Let $K(\omega, \tau)$ and $Q(\omega, \tau)$ represent the real part and the imaginary part of the cross-spectrum $D(\omega, \tau)$, the cross-spectrum $D(\omega, \tau)$ is represented by the following expression (5):

$$D(\omega,\tau)=K(\omega,\tau)+jQ(\omega,\tau) \tag{5}$$

In this case, the phase $\Phi_D(\omega, \tau)$ of the cross-spectrum $D(\omega, \tau)$ is represented by the following expression (6):

$$\Phi_D(\omega, \tau) = \tan^{-1}\left(\frac{Q(\omega, \tau)}{K(\omega, \tau)}\right). \tag{6}$$

As shown in FIG. 5A, the phase $\Phi_D(\omega, \tau)$ obtained from the expression (6) means a phase angle regarding each spectral component based on the sound reception signal of each microphone. Therefore, the phase $\Phi_D(\omega, \tau)$ divided by the angular frequency $\omega$ is the arrival time difference $\delta(\omega, \tau)$. This relationship is represented as the following expression (7):

$$\delta(\omega, \tau) = \frac{\Phi_D(\omega, \tau)}{\omega}. \tag{7}$$

By representing the frequency as f [Hz], representing the angular frequency as $\omega=2\pi f$ and using the expression (3) and the expression (7), the angle θ [rad] indicating the arrival direction is represented by the following expression (8):

$$\theta[\text{rad}] = \sin^{-1}\left(\frac{c \cdot \Phi_D(\omega, \tau)}{2\pi f \cdot d}\right). \quad (8)$$

As described above, the arrival direction estimation unit 17 is capable of calculating the angle θ indicating the arrival direction of the voice arriving at the first microphone 11*a* and the second microphone 11*b* by using the expression (8).

<Example of Arrival Direction Phase Table 15>

FIG. 6 is a diagram showing an example of the arrival direction phase table 15. In FIG. 6, the distance difference corresponds to the arrival time difference $\delta_\theta$ shown in FIG. 4. The inter-microphone sample difference indicates the distance difference in terms of the number of samples. In FIG. 6, sin θ represents the sine of the angle Θ indicating the arrival direction shown in FIG. 4. In FIG. 6, Θ [rad] represents the angle Θ indicating the arrival direction in the circular measure, and Θ [degree] represents the angle θ indicating the arrival direction in the degree measure. In FIG. 6, the phase [degree] (f=4 kHz) of the cross-spectrum indicates the phase $\Phi_D(\omega, \tau)$ when f=4 kHz. In FIG. 6, the phase [degree] (f=6 kHz) of the cross-spectrum indicates the phase $\Phi_D(\omega, \tau)$ when f=6 kHz.

As is understandable from FIG. 6, when the arrival direction of voice at a high frequency such as f=4 kHz and f=6 kHz is determined based on the phase alone, there are cases where an erroneous angle θ is calculated. For example, when considering the case where the inter-microphone sample difference is 1 and the case where the inter-microphone sample difference is 5 in FIG. 6, there are two candidates for the arrival direction: "8.1°" (i.e., 8.144301°) and "45.1°" (i.e., 45.09947°). That is, in the method of determining the arrival direction of the voice based on the phase alone, the arrival directions 8.1° and 45.1' cannot be distinguished from each other in the band of 4 kHz, and if the target voice and a voice other than the target voice arrive respectively from the directions of 8.1° and 45.1°, these voices cannot be separated from each other. Therefore, in the sound collection device 1 according to the first embodiment, the determination of the arrival direction of the voice is made by using the phase $\Phi_D(\omega, \tau)$ and the arrival direction of the voice estimated by the arrival direction estimation unit 17 by using a voice component in a low frequency band.

<Operation of Mask Coefficient Determination Unit 14>

FIG. 7 is a diagram showing an example of a determination process of a mask coefficient b(ω, τ) by use of the arrival direction phase table 15. The mask coefficient determination unit 14 generates the mask coefficient b(ω, τ) based on the phase $\Phi_D(\omega, \tau)$ of the cross-spectrum D(ω, τ), the angle θ indicating the arrival direction of the voice, and the arrival direction phase table 15. For example, when the phase $\Phi_D(\omega, \tau)$ of the cross-spectrum D(ω, τ) is 90° (f=4 kHz) and the angle indicating the arrival direction of the voice is 8.1°, a matching item 31 exists in the arrival direction phase table 15 (i.e., there exists a case satisfying a predetermined condition), and thus the mask coefficient determination unit 14 sets the mask coefficient b(ω, τ) at 1, or sets the mask coefficient b(ω, τ) at 0 when no matching item exists in the arrival direction phase table 15.

As shown in the arrival direction phase table 15, in the items in which the phase $\Phi_D(\omega, \tau)$ of the cross-spectrum D(ω, τ) is 90° (f=4 kHz), there are the case where the angle of the arrival direction is 8.1° and the case where the angle of the arrival direction is 45.1°. Thus, suppose that the mask coefficient determination unit 14 estimates the arrival direction based exclusively on the phase $\Phi_D(\omega, \tau)$ of the cross-spectrum D(ω, τ), there is a danger of erroneously determining the arrival direction. Therefore, in the first embodiment, when data matching both of the arrival direction estimated by the arrival direction estimation unit 17 and the phase $\Phi_D(\omega, \tau)$ calculated by the phase calculation unit exists in the arrival direction phase table 15, the arrival direction matching the data is employed. Here, to "match" does not mean that the calculation value totally coincides with the numerical value indicated in the arrival direction phase table 15 but means that the calculation value is in a range including a predetermined error from the numerical value indicated in the arrival direction phase table 15 (i.e., in a band having a certain width).

Figure 8:
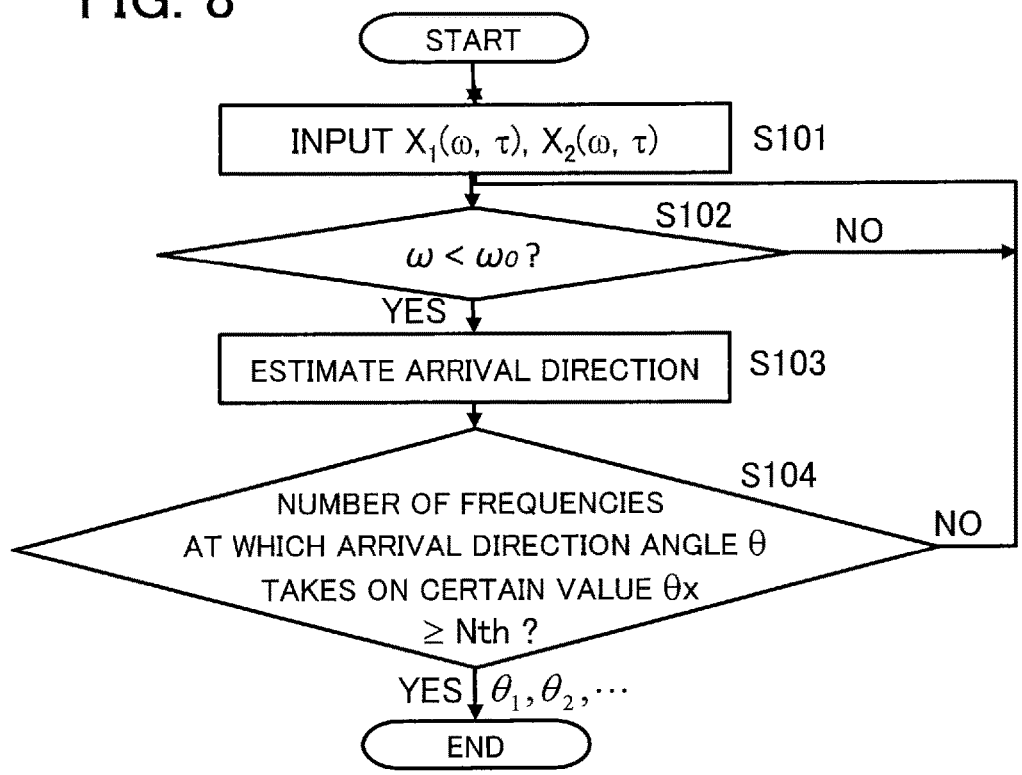
FIG. 8 is a flowchart showing a calculation process of an arrival direction of a voice.

FIG. 8 is a flowchart showing an example of a calculation process of an arrival direction of a voice. When the first signal $X_1(\omega, \tau)$ and the second signal $X_2(\omega, \tau)$ are received (step S101), the arrival direction estimation unit 17 judges whether or not ω<ω₀ holds (step S102). If the judgment is YES (step S102), the arrival direction estimation unit 17 calculates the angle θ indicating the arrival direction (step S103), and judges whether or not the number of times when the angle θ took on the same calculation value θx has become greater than or equal to a predetermined count Nth (step S104). If the judgment is NO in the step S102 or the judgment is NO in the step S104, the arrival direction estimation unit 17 waits for the next input of the first signal $X_1(\omega, \tau)$ and the second signal $X_2(\omega, \tau)$.

Figure 9:
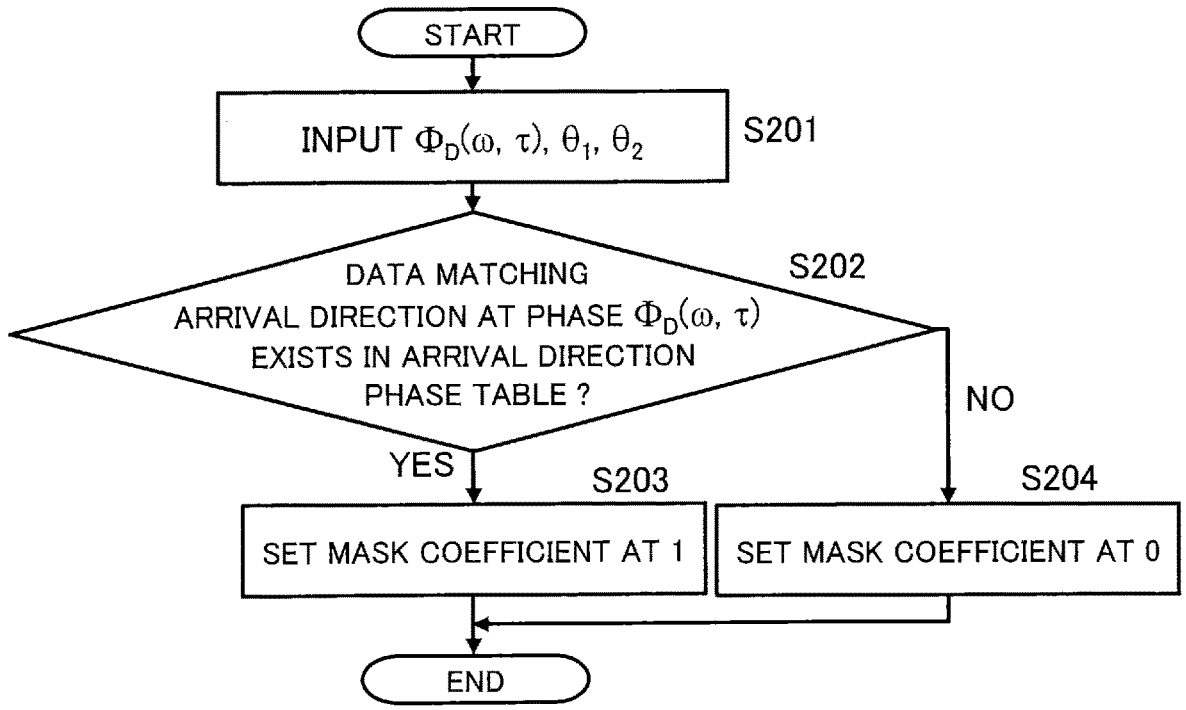
FIG. 9 is a flowchart showing the determination process of the mask coefficient.

FIG. 9 is a flowchart showing an example of the determination process of the mask coefficient b(ω, τ). When the phase $\Phi_D(\omega, \tau)$ is received from the phase calculation unit 13 and the angles θ (e.g., $\theta_1$, $\theta_2$) indicating the arrival directions of the voices are received from the arrival direction estimation unit 17, the mask coefficient determination unit 14 judges whether or not data matching the angle $\theta_1$ indicating the arrival direction at the phase $\Phi_D(\omega, \tau)$ or the angle $\theta_2$ indicating the arrival direction at the phase $\Phi_D(\omega, \tau)$ exists in the arrival direction phase table 15 (step S202). The mask coefficient determination unit 14 sets the mask coefficient at 1 (step S203) if data matching both of the arrival direction estimated by the arrival direction estimation unit 17 and the phase $\Phi_D(\omega, \tau)$ calculated by the phase calculation unit 13 exists in the arrival direction phase table 15, or sets the mask coefficient at 0 (step S204) if such data does not exist in the arrival direction phase table 15.

Effect of First Embodiment

According to the first embodiment, the arrival direction of the voice as the direction corresponding to the direction of the speaker uttering the target voice is estimated by using a signal at an angular frequency ω lower than the lower limit angular frequency ω₀ causing the spatial aliasing. Then, the arrival direction is determined based on the estimated arrival direction, the phase $\Phi_D(\omega, \tau)$ of the cross-spectrum D(ω, τ), and the arrival direction phase table 15. Therefore, the sound source separation in regard to a voice in a high frequency range, which has sometimes been inaccurate with the conventional technology, can be executed with high accuracy.

Further, since sparseness of voices is used in the first embodiment, the target voice can be separated with high accuracy even when the number of speakers (i.e., the number of sound sources) is unknown.

Furthermore, according to the first embodiment, calculation with a great amount of computation such as probability calculation is unnecessary, and thus the target voice can be separated with high accuracy with a small amount of computation.

Second Embodiment

Figure 10:
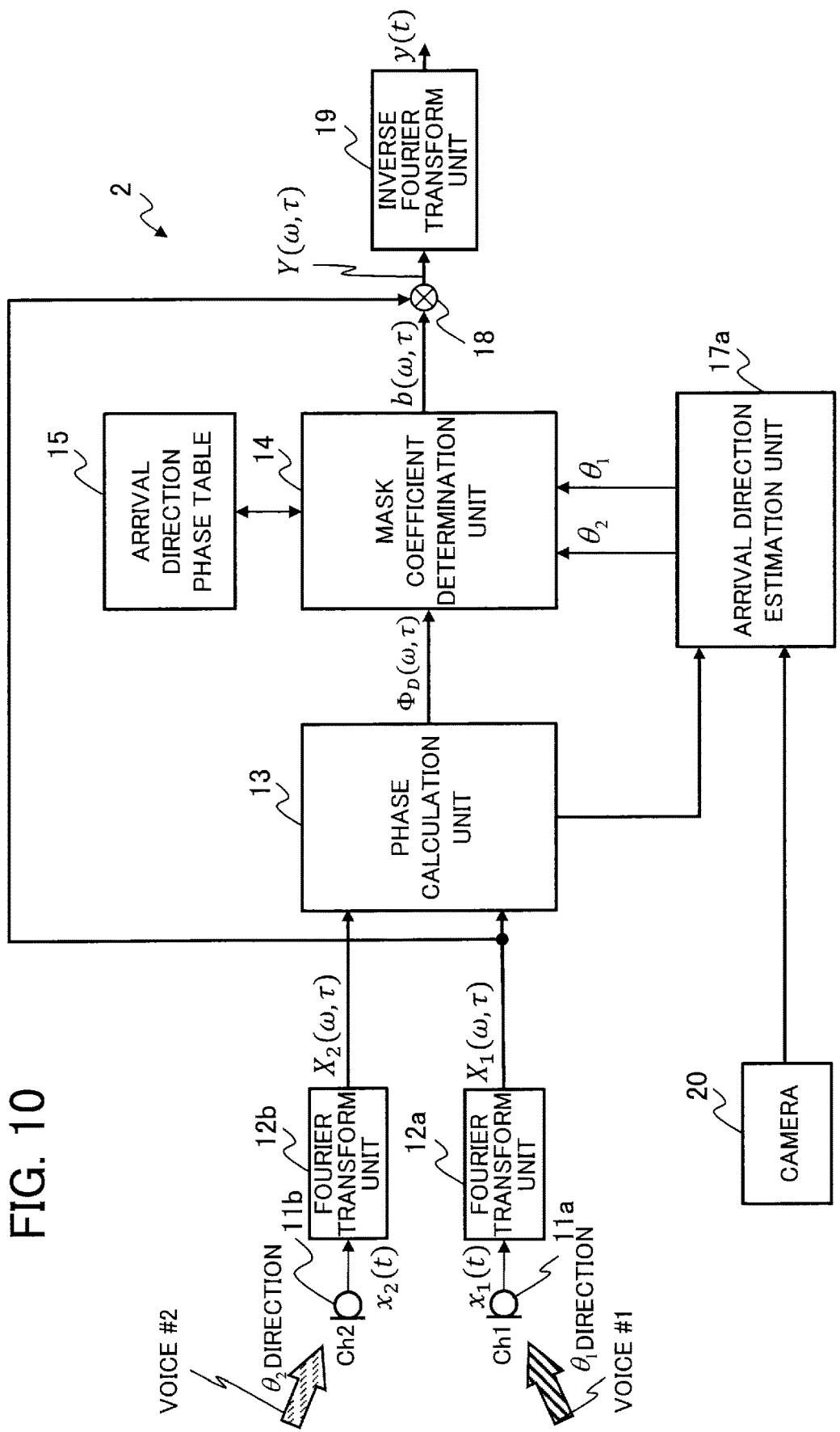
FIG. 10 is a functional block diagram schematically showing the configuration of a sound collection device according to a second embodiment.

FIG. 10 is a functional block diagram schematically showing the configuration of a sound collection device 2 according to a second embodiment. In FIG. 10, each component identical or corresponding to a component shown in FIG. 1 is assigned the same reference character as in FIG. 1. The sound collection device 2 is a device capable of executing a sound collection method according to the second embodiment. In the sound collection device 2, an arrival direction estimation unit 17a estimates the arrival direction of the voice based on an image obtained by photographing one or more speakers with a camera 20.

According to the second embodiment, the arrival direction is determined based on the arrival direction estimated based on the image, the phase $\Phi_D(\omega, \tau)$ of the cross-spectrum $D(\omega, \tau)$, and the arrival direction phase table 15. Therefore, the sound source separation in regard to a voice in a high frequency range, which has sometimes been inaccurate with the conventional technology, can be executed with high accuracy.

Further, according to the second embodiment, calculation with a great amount of computation such as probability calculation is unnecessary, and thus the target voice can be separated with high accuracy with a small amount of computation.

Except for the above-described features, the second embodiment is the same as the first embodiment.

DESCRIPTION OF REFERENCE CHARACTERS 1, 2: sound collection device, 11a: first microphone, 11b: second microphone, 12a: first Fourier transform unit, 12b: second Fourier transform unit, 13: phase calculation unit, 14: mask coefficient determination unit, 15: arrival direction phase table, 16: spatial aliasing calculation unit, 17, 17a: arrival direction estimation unit, 18: filter, 19: inverse Fourier transform unit, 20: camera, $x_1(t)$: first sound reception signal, $x_2(t)$: second sound reception signal, $X_1(\omega, \tau)$: first signal, $X_2(\omega, \tau)$: second signal, $D(\omega, \tau)$: cross-spectrum, $\Phi_D(\omega, \tau)$: phase, $b(\omega, \tau)$: mask coefficient, $Y(\omega, \tau)$: separated signal, $y(t)$: signal of target voice.

What is claimed is:

1. A sound collection device that separates a signal of a target voice from a first sound reception signal outputted from a first microphone to which voice is inputted and a second sound reception signal outputted from a second microphone to which the voice is inputted, the sound collection device comprising:
processing circuitry
to perform Fourier transform on the first sound reception signal and to output a first signal;
to perform Fourier transform on the second sound reception signal and to output a second signal;
to estimate an arrival direction of the voice;
to calculate a phase of a cross-spectrum of the first signal and the second signal;
to determine a mask coefficient based on an arrival direction phase table read out from a previously generated database and indicating a relationship between the phase and the arrival direction regarding each frequency band, the calculated phase, and the estimated arrival direction;
to separate a signal from the first signal or the second signal by using the mask coefficient; and
to perform inverse Fourier transform on the separated signal and to output the signal of the target voice.

2. The sound collection device according to claim 1, wherein
the processing circuitry
judges whether or not a phase and an arrival direction matching the calculated phase and the estimated arrival direction exist in the arrival direction phase table,
sets the mask coefficient at 1 if the matching phase and arrival direction exist, and sets the mask coefficient at 0 if the matching phase and arrival direction does not exist, and
multiplies the first signal or the second signal by the mask coefficient.

3. The sound collection device according to claim 1, wherein the processing circuitry estimates the arrival direction based on a signal out of the first signal and the second signal at an angular frequency lower than a lower limit angular frequency causing spatial aliasing.

4. The sound collection device according to claim 3, wherein the processing circuitry estimates the arrival direction based on the signal at an angular frequency lower than $\omega_0 = c/2d$, where $\omega_0$ represents the lower limit angular frequency causing the spatial aliasing, d represents a distance between the first microphone and the second microphone, and c represents speed of sound.

5. The sound collection device according to claim 1, wherein the processing circuitry estimates the arrival direction based on an image obtained by camera photographing of one or more speakers.

6. A sound collection method executed by a sound collection device that separates a signal of a target voice from a first sound reception signal outputted from a first microphone to which voice is inputted and a second sound reception signal outputted from a second microphone to which the voice is inputted, the sound collection method comprising:
performing Fourier transform on the first sound reception signal and outputting a first signal;
performing Fourier transform on the second sound reception signal and outputting a second signal;
estimating an arrival direction of the voice;
calculating a phase of a cross-spectrum of the first signal and the second signal;
determining a mask coefficient based on an arrival direction phase table read out from a previously generated database and indicating a relationship between the phase and the arrival direction regarding each frequency band, the calculated phase, and the estimated arrival direction;
separating a signal from the first signal or the second signal by using the mask coefficient; and
performing inverse Fourier transform on the separated signal and outputting the signal of the target voice.

7. A sound collection program that causes a computer to execute a process of separating a signal of a target voice from a first sound reception signal outputted from a first microphone to which voice is inputted and a second sound reception signal outputted from a second microphone to which the voice is inputted, wherein the sound collection program causes the computer to execute:
performing Fourier transform on the first sound reception signal and outputting a first signal;
performing Fourier transform on the second sound reception signal and outputting a second signal;

estimating an arrival direction of the voice;
calculating a phase of a cross-spectrum of the first signal and the second signal;
determining a mask coefficient based on an arrival direction phase table read out from a previously generated database and indicating a relationship between the phase and the arrival direction regarding each frequency band, the calculated phase, and the estimated arrival direction;
separating a signal from the first signal or the second signal by using the mask coefficient; and
performing inverse Fourier transform on the separated signal and outputting the signal of the target voice.

* * * * *